(12) United States Patent
Cone

(10) Patent No.: US 9,696,710 B2
(45) Date of Patent: Jul. 4, 2017

(54) METHOD AND SYSTEM FOR MEASURING THE DYNAMIC RESPONSE OF A STRUCTURE DURING A MACHINING PROCESS

(75) Inventor: Michael Cone, Kihei, HI (US)

(73) Assignee: VIBRATION TECHNOLOGIES, LLC, San Rafael, CA (US)

(*) Notice: Subject to any disclaimer, the term of this patent is extended or adjusted under 35 U.S.C. 154(b) by 1797 days.

(21) Appl. No.: 12/940,878

(22) Filed: Nov. 5, 2010

(65) Prior Publication Data

US 2011/0106292 A1    May 5, 2011

Related U.S. Application Data

(60) Provisional application No. 61/258,551, filed on Nov. 5, 2009.

(51) Int. Cl.
| | |
|---|---|
| B24B 49/00 | (2012.01) |
| B24B 49/16 | (2006.01) |
| G05B 19/401 | (2006.01) |
| G01H 1/00 | (2006.01) |

(52) U.S. Cl.
CPC .......... *G05B 19/401* (2013.01); *B24B 49/00* (2013.01); *B24B 49/16* (2013.01); *G01H 1/00* (2013.01); *G05B 2219/37355* (2013.01); *G05B 2219/37432* (2013.01); *G05B 2219/37433* (2013.01); *G05B 2219/37573* (2013.01); *G05B 2219/37612* (2013.01); *G05B 2219/50074* (2013.01); *Y02P 90/265* (2015.11)

(58) Field of Classification Search
CPC ....... B24B 49/00; B24B 49/003; B24B 49/10; B24B 49/16; G05B 19/401; G05B 2219/37355; G05B 2219/37432; G05B 2219/37433; G05B 2219/37573; G05B 2219/37612; G05B 2219/50074; G01H 1/00
USPC .................................. 451/8, 10, 11
See application file for complete search history.

(56) References Cited

U.S. PATENT DOCUMENTS

| | | | | |
|---|---|---|---|---|
| 3,967,515 | A | * | 7/1976 | Nachtigal et al. ............... 82/118 |
| 5,245,793 | A | * | 9/1993 | Schmitz ......................... 451/49 |
| 5,447,463 | A | * | 9/1995 | Schmitz ......................... 451/14 |
| 5,762,536 | A | * | 6/1998 | Pant et al. ........................ 451/6 |
| 6,325,706 | B1 | * | 12/2001 | Krusell et al. ................. 451/296 |
| 6,565,293 | B2 | * | 5/2003 | Desmoulins ..................... 408/10 |
| 6,869,498 | B1 | * | 3/2005 | Tsai et al. ................. 156/345.13 |
| 7,294,041 | B1 | * | 11/2007 | Lee et al. ........................... 451/8 |
| 7,497,134 | B2 | * | 3/2009 | Renken et al. ............ 73/862.68 |
| 2008/0087105 | A1 | * | 4/2008 | Renken et al. ............ 73/862.68 |

(Continued)

FOREIGN PATENT DOCUMENTS

JP    2012171093  A  *  9/2012

*Primary Examiner* — Eileen Morgan
(74) *Attorney, Agent, or Firm* — Artegis Law Group, LLP

(57) ABSTRACT

A machine implement includes sensors that measure a force imparted by the machine implement to a structure during a machining process. A sensor array coupled to the structure measures the vibrational response of the structure to the imparted force. Analysis software compares the imparted force to the vibrational response to generate a transfer function for the structure. Based on the transfer function, a tool-path of the machine implement may be adjusted such that the resulting structure has precise vibrational characteristics that substantially comply with a set of design goals for the structure.

20 Claims, 6 Drawing Sheets

(56) References Cited

U.S. PATENT DOCUMENTS

2010/0099333 A1* 4/2010 Sudargho et al. .............. 451/5
2013/0122783 A1* 5/2013 Menk et al. .................... 451/11

* cited by examiner

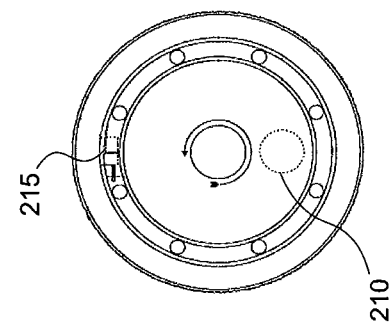
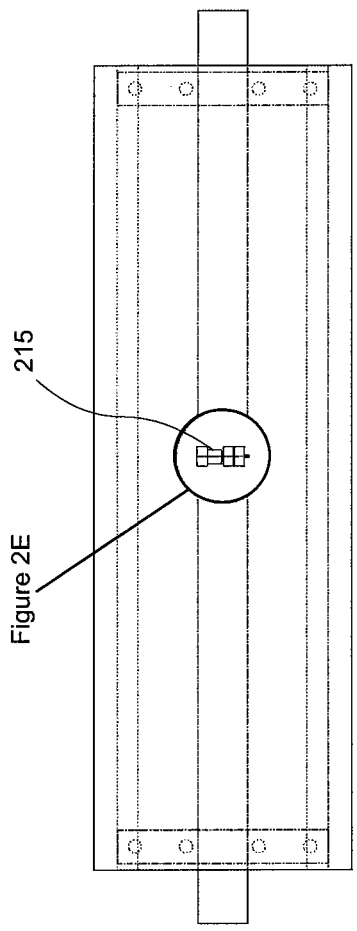
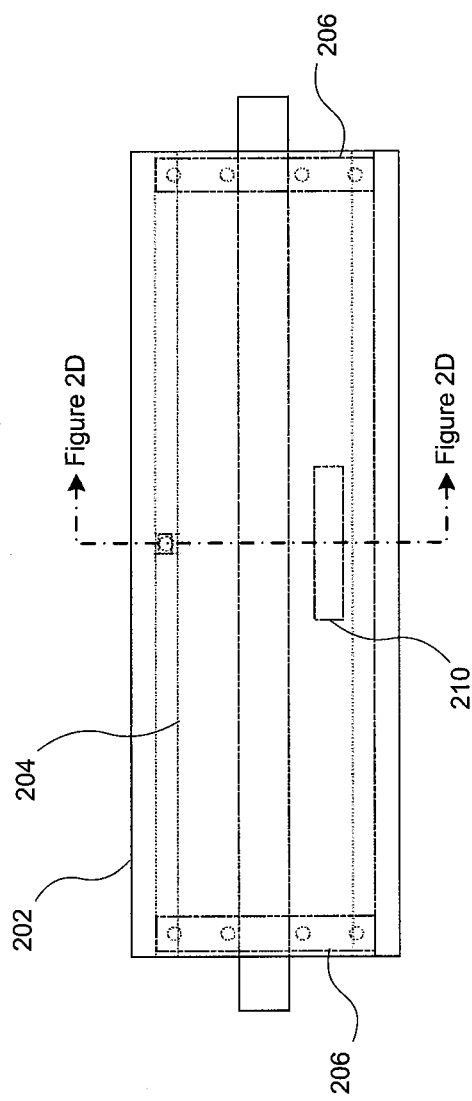

METHOD AND SYSTEM FOR MEASURING THE DYNAMIC RESPONSE OF A STRUCTURE DURING A MACHINING PROCESS

CROSS-REFERENCE TO RELATED APPLICATIONS

This application claims the priority benefit of Provisional U.S. Patent Application Ser. No. 61/258,551, filed Nov. 5, 2009, the subject matter of which is hereby incorporated herein by reference.

BACKGROUND OF THE INVENTION

Field of the Invention

The invention relates generally to the design and manufacture of structures, and, more specifically, to a method and system for measuring the dynamic response of a structure during a machining process.

Description of the Related Art

Conventional structural analysis techniques can be used to manufacture and/or modify a wide range of different structures, including musical instruments, buildings, airframes, and surfboards, among other things. A designer of a structure may implement one or more different structural analysis techniques to design and build the structure to have particular vibrational characteristics. Modern structural analysis techniques involve generating a computer model of the structure. A physical simulation of the computer model can be used to predict the vibrational characteristics of the structure. The design of the structure may then be modified based on the predicted vibrational characteristics of the structure.

One problem with this technique is that physical simulations are inherently inaccurate and cannot predict the vibrational characteristics of a structure with arbitrary accuracy. To solve this problem, designers often test the vibrational characteristics of structures once those structures have already been built. For example, the designer of a guitar may use a microphone to measure the resonant frequencies associated with the guitar. The designer may then make structural modifications to the guitar based on the measured resonant frequencies.

Through this technique, the vibrational characteristics of the structure can be measured directly instead of predicted. However, this approach suffers from certain drawbacks. Specifically, the vibrational characteristics of the structure can only be measured once fabrication of that structure is complete. Oftentimes, re-fabrication or modification of the structure is not possible, and, thus, the vibrational characteristics of the structure cannot be changed to comply with design goals.

Accordingly, what is needed in the art is a better way to fabricate a structure.

SUMMARY OF THE INVENTION

One embodiment of the invention sets forth a machine tool for measuring the dynamic response of a material during a machining process. The machine tool includes a machining implement configured to modify a material during a machining operation and a sensor coupled to the machining implement and configured to measure a force of impact of the machine tool with the material during the machining operation.

One advantage of the disclosed approach is that the process of machining a material can be dynamically adjusted based on the measured response of the material. The conventional method of machining a material, measuring the vibrational characteristics of the material, and then modifying the material (if possible) based on the measured characteristics, in multiple, iterative passes, is time consuming. In contrast, a machining process that implements the disclosed approach may produce a structure with precise vibrational characteristics in a single step. Thus, a structure necessitating precise vibrational characteristics can be generated with relative ease compared to prior art approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 2A-2E illustrate a machine tool with an integrated force gauge, according to one embodiment of the present invention;

DETAILED DESCRIPTION

The purpose of the invention is to simultaneously excite a material or a structure and measure the dynamic response of the material or structure to the excitation force during a machining process. Coupled with the capability to measure the vibrational characteristics of the material or structure in real-time, the machining process can be adjusted dynamically to cause the resulting material or structure to comply with certain design goals. This functionality can be used to quickly fabricate machined materials or structures having precise vibrational characteristics.

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

As used herein, a "machining process" is the overarching process for modifying a material or creating a structure from a material by removing or modifying various amounts of material to generate a structure within the material having a particular shape. The machining process may include configuring a machine tool, generating an excitation signal, generating a dynamic response signal, analyzing the signals, and adjusting a tool-path of the machine tool to modify the material or adjust the shape of the structure. A machining process may include one or more "machining operations" that are defined as the actual physical modification of the material, such as a cutting operation by impacting a surface of the material with a cutting surface of the machine tool or a sanding operation such as impacting a surface of the material with an abrasive surface of the machine tool.

Figure 1:
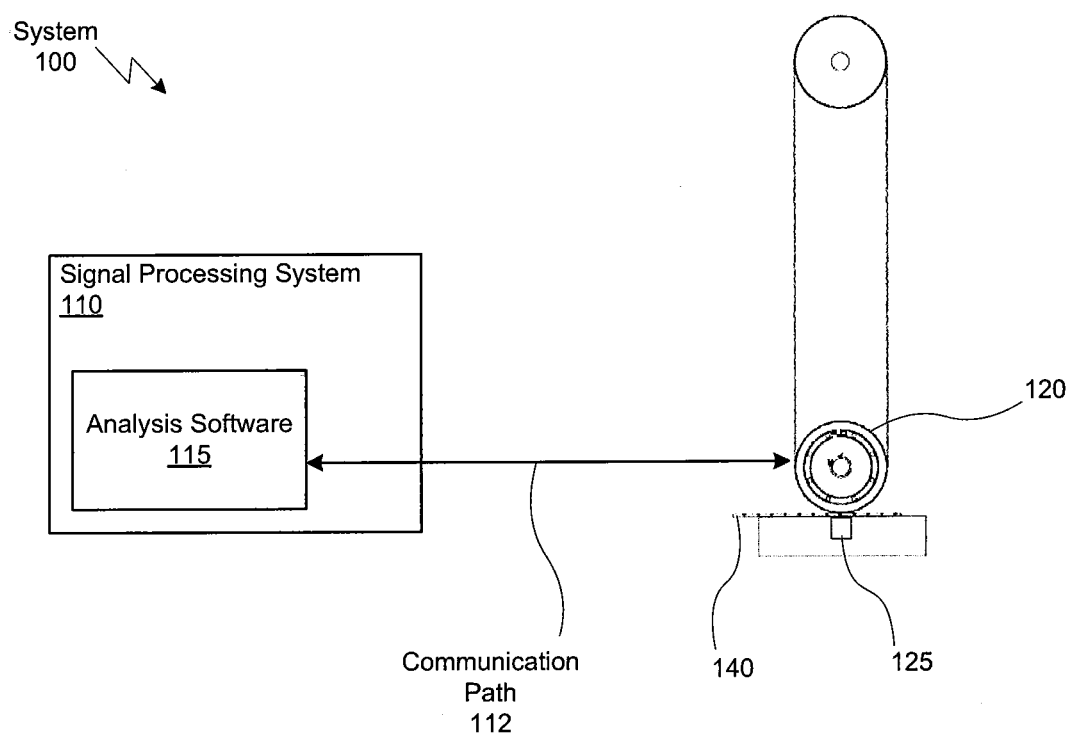
FIG. 1 illustrates a conceptual diagram of a system configured to implement one or more aspects of the present invention.

FIG. 1 illustrates a conceptual diagram of a system 100 configured to implement one or more aspects of the present invention. System 100 includes a signal processing system 110 configured to communicate with a machine tool 120 via a communication path 112. Signal processing system 110 may be configured to analyze an excitation force imparted to a material 140 being machined by machine tool 120 and a dynamic response of the material 140 to the excitation force. By comparing the excitation force to the dynamic response of the material 140, signal processing system 110 may perform a real-time modal analysis of the structure created in material 140 by the machining process. In response to such an analysis, signal processing system 110 may also be configured to adjust a tool-path of machine tool 120 such that that resulting structure created in material 140 has precise vibrational characteristics that substantially match vibrational characteristics embodied in a set of design goals for that structure. In one embodiment, signal processing system 110 is a computer system configured to execute analysis software 115.

Analysis software 115 may be configured to determine a tool-path for machine tool 120 such that the resulting structure created in material 140 by the machining process has precise vibrational characteristics. In one embodiment, analysis software 115 may be modeling software such as NASA Structural Analysis software (Nastrans). Analysis software 115 may be used to compute predicted effects resulting from removing various amounts of material from the structure being machined from material 140 during a machining process. Analysis software 115 may also be used to predict a discrepancy between the excitation force imparted to material 140 and the dynamic response of material 140 to the excitation force. Such a discrepancy could result from material being removed from the structure during the machining process.

Because the invention incorporates similar analyses as those analyses commonly performed in non-destructive testing procedures, analysis software 115 may incorporate commonly available analysis routines without many changes required. In some embodiments, analysis software 115 may incorporate commonly available analysis routines that have been modified to include calibration or signal processing adjustments. Such modifications may allow normal data acquisition processes used in modal analysis to be extended to real-time machining processes. For example, analysis software 115 may be calibrated to account for the weight of a tool or instrument directly connected to a force gauge that measures the excitation force imparted to the material.

Machine tool 120 may be configured to modify material 140 such that a structure is generated in material 140 having precise vibrational characteristics that substantially match a set of design goals for the structure. Machine tool 120 may include cutting surfaces or abrasive surfaces that impart an excitation force to material 140 during the machining operation. Machine tool 120 may also include one or more sensors that are configured to measure the excitation force imparted to the material 140 during the machining operation and generate an excitation signal to be transmitted to signal processing system 110. One of ordinary skill in the art will readily appreciate that machine tool 120 may be any type of machine tool such as a belt sander, milling machine or other rotary machine tool configured to modify a material 140 in a manner that imparts an excitation force to the material 140.

Sensor 125 may be coupled to a material 140 during the machining process. Sensor 125 measures the dynamic response of the material 140 to the excitation force imparted to the material 140 by machine tool 120. In one embodiment, Sensor 125 may include one or more sensors such as accelerometers, air velocity sensors, microphones, or other sensors placed in proximity to the point of contact between machine tool 120 and material 140. Sensor 125 generates a dynamic response signal to be transmitted to signal processing system 110.

In some embodiments, material 140 may be clamped during the machining process. Because clamping material 140 may dampen the dynamic response, a transfer function for the clamps may be computed and filtered out of the measured dynamic response associated with the structure. One approach to computing the transfer function of the clamps is to measure the un-damped response of a target structure, measure the damped response of the target structure (i.e., while clamped), and then analyze the difference between the un-damped response and the damped response to calculate a transfer function for the clamps. When machining a structure to comply with a set of design goals with similar vibrational characteristics as the target structure, the damping effect of the clamps may be filtered out using the computed transfer function.

The excitation signal and the dynamic response signal generated during the machining process are transmitted to signal processing system 110 via communication path 112. In one embodiment, communication path 112 is a wireless communication medium such as a wireless local area network (IEEE 802.11) or other radio frequency communication protocol. A wireless transmitter incorporated into machine tool 120 may be configured to transmit an excitation signal to a wireless receiver coupled to signal processing system 110. In alternative embodiments, communication path 112 may be a wired connection to signal processing system 110. Although a wireless system is not essential for the operation of system 100, the wireless system may greatly simplify calibration and machining operations by allowing various tools to be interchanged without requiring a machinist to physically connect the tool to a communication interface disposed within system 100.

As described above, the machining process may include one or more machining operations to modify material 140 to create the desired structure. Machining operations include cutting operations such as those commonly performed with a milling machine as well as sanding operations such as those commonly performed with a belt or disk sanding machine. As described more fully in detail below, FIGS. 2A through 4C illustrate various machine tools that may be implemented within system 100.

Figure 2E:
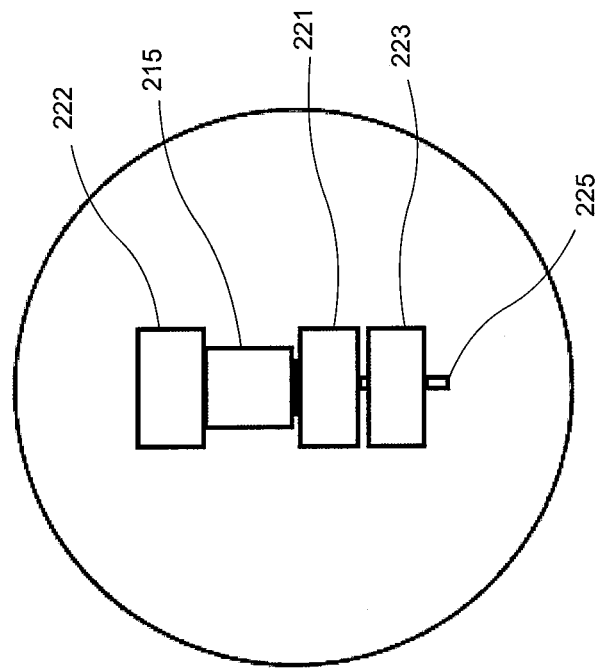
Figure 2D:
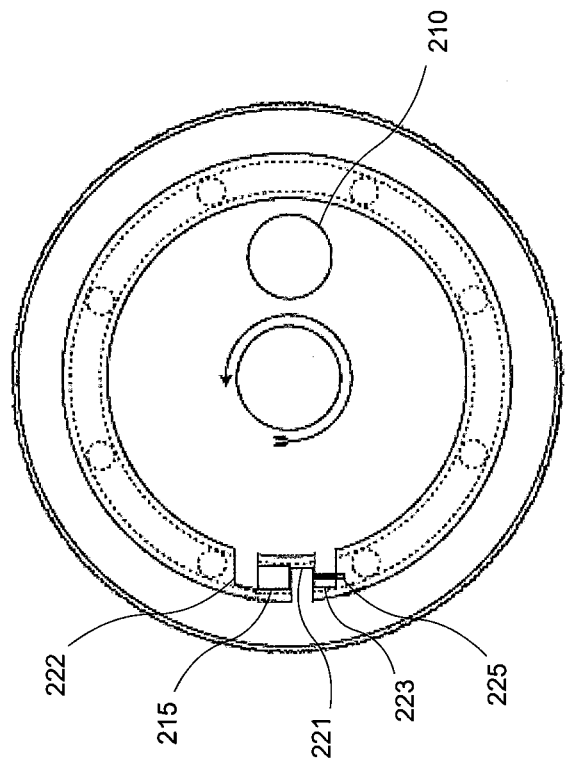

FIGS. 2A-2E illustrate a machine tool 200 with an integrated force gauge 215, according to one embodiment of the present invention. FIGS. 2A, 2B and 2C are front, right and top views of machine tool 200, respectively. FIG. 2D is a section view of machine tool 200 generated from a cutting plane as shown in FIG. 2A. FIG. 2E is a detail view of force gauge 215 as shown in FIG. 2C. As shown, machine tool 200 is a sanding drum that may be implemented as machine tool 120 of system 100. Machine tool 200 includes an internal cylinder 204 coupled to a driveshaft 208 driven by a drive train (not shown) in rotary motion. An external cylinder 202 is mounted concentric to the internal cylinder 204 and supported by bearings 206. When machine tool 200 is rotated by the drive train, causing an abrasive surface to be driven against a material 140, the material 140 exerts a force on the external cylinder 202 in reaction to the machining operation. The force exerted on external cylinder 202 may be measured using a force gauge 215 disposed between the external cylinder 202 and the internal cylinder 204.

Machine tool 200 may also include onboard circuitry 210 configured to condition the signal generated by force gauge 215 and to transmit the conditioned signal to signal processing system 110. Onboard circuitry 210 may include signal conditioning circuitry as well as wireless transmitters or other communication interface circuitry. In various embodiments, on-board piezoelectric or Terfenol-D components may generate sufficient current and voltage to power onboard circuitry 210. In such embodiments, the piezoelectric or Terfenol-D components may provide power during machining to charge a battery or capacitor (not shown). When the battery or capacitor is sufficiently charged, the battery or capacitor may be coupled to field effect transistors (FETs) to provide power for onboard circuitry 210 as well as force gauge 215.

As shown in FIGS. 2D and 2E, force gauge 215 is disposed between boss 221 protruding from external cylinder 202 and boss 222 protruding from internal cylinder 204. Internal cylinder 204 may also include boss 223 that holds set screw 225, which is configured to adjust the backlash between the external cylinder 202 and internal cylinder 204 by applying a preload to force gauge 215. Force gauge 215 may comprise an appropriate sensor material such as a piezoelectric material, Terfenol-D, or other material that generates an electrical signal in proportion to the force exerted against the material.

The integrated force gauge 215 generates an excitation signal in response to a force exerted by material 140 against external cylinder 202 during a machining operation. As the internal cylinder 204 is rotated, external cylinder 202 is driven in the same direction via the interference between boss 221, boss 222 and the force gauge 215. As material 140 is machined, the forces generated by the machining operation act against the external cylinder 202 such that boss 221 compresses force gauge 215 against boss 222. This compressive force causes force gauge 215 to generate an excitation signal that is proportional to the force exerted against external cylinder 202 by the machining operation. The excitation signal may be transmitted to signal processing system 100 via onboard circuitry 210.

Figure 3C:
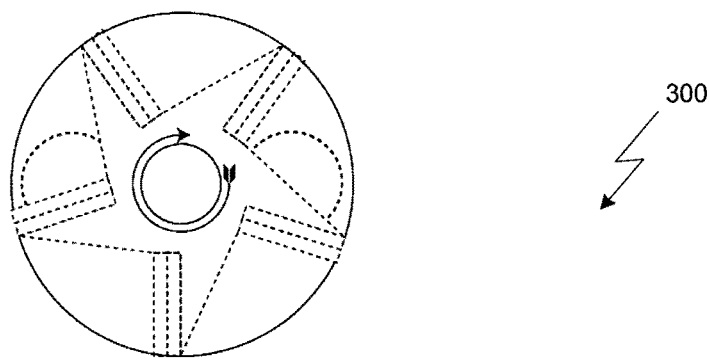
FIGS. 3A-3D illustrate a machine tool with an integrated force gauge, according to another embodiment of the present invention.
Figure 3A:
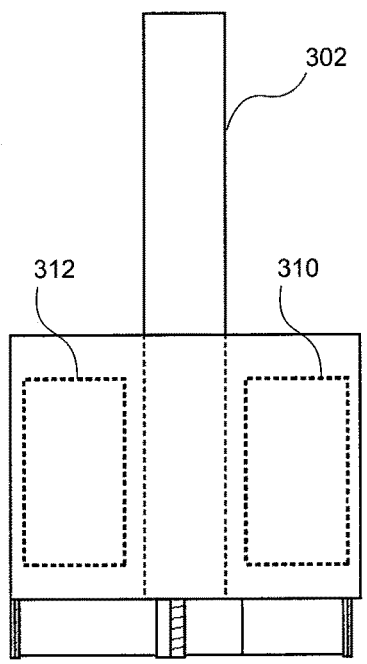
Figure 3B:
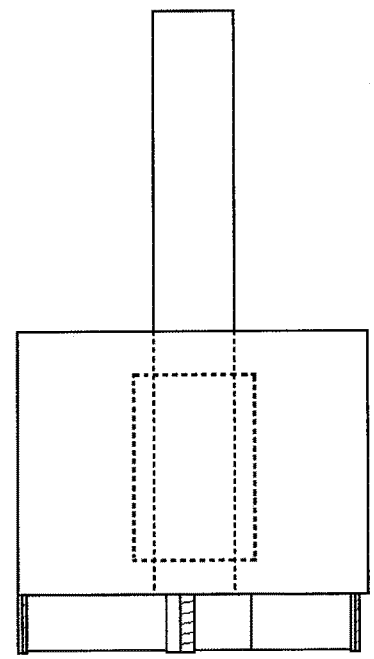
Figure 3D:
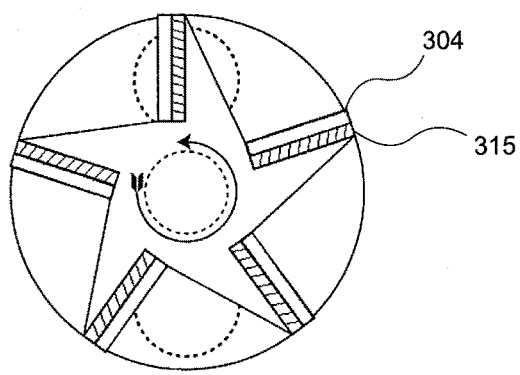

FIGS. 3A-3D illustrate a machine tool 300 with an integrated force gauge 315, according to another embodiment of the present invention. FIGS. 3A, 3B, 3C and 3D are front, right, top and bottom views of machine tool 300, respectively. As shown in FIG. 3A, machine tool 300 is a cutting bit that may be coupled to a machine such as a milling machine for performing machining operations. Machine tool 300 includes a body 302, coupled to which are a number of cutting surfaces 304 and a corresponding number of force gauges 315 disposed between the body 302 and the cutting surfaces 304 and configured to measure the force of impact of each cutting action during a machining operation performed on material 140. The force of impact corresponding to each cutting action excites material 140 in a random pattern similar to the force of an impact hammer or random noise signal generator.

The force signal measured by force gauges 315 may be amplified and transmitted to signal processing system 100 via onboard circuitry 310. Similarly to onboard circuitry 210 of machine tool 200, onboard circuitry 310 may include signal conditioning circuitry as well as wireless transmitters or other communication interface circuitry. Machine tool 300 includes power generation components 312 that may include piezoelectric or Terfenol-D components coupled to FETs and configured to charge a battery or capacitor that provides power to onboard circuitry 310 as well as force gauge 315.

Figure 4C:
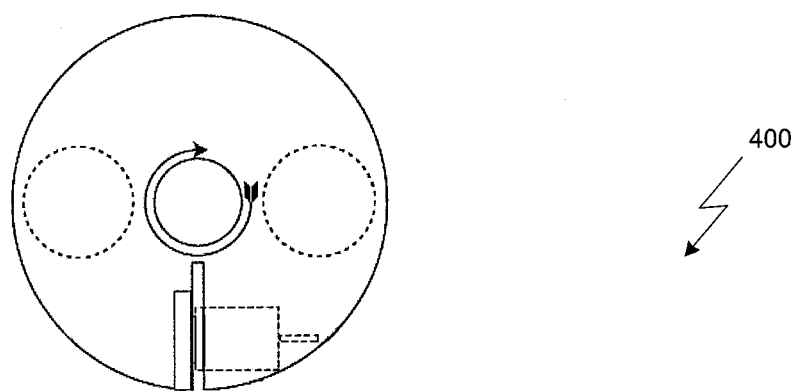
FIGS. 4A-4C illustrate a machine tool with an integrated force gauge, according to yet another embodiment of the present invention.
Figure 4A:
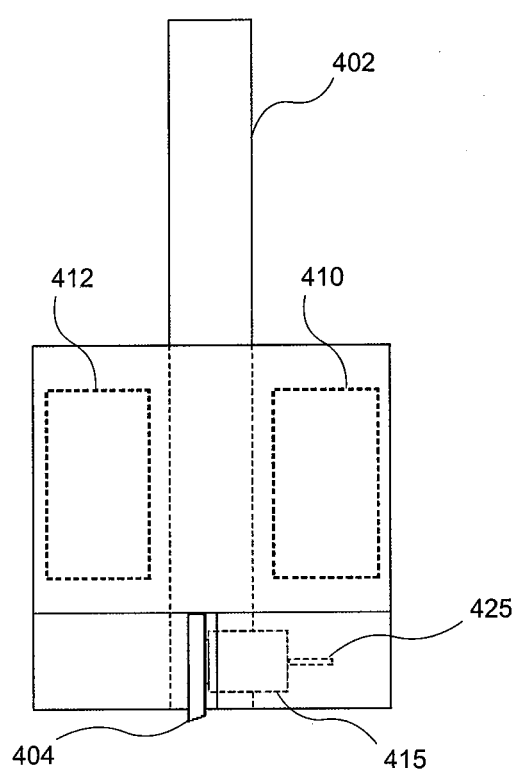
Figure 4B:
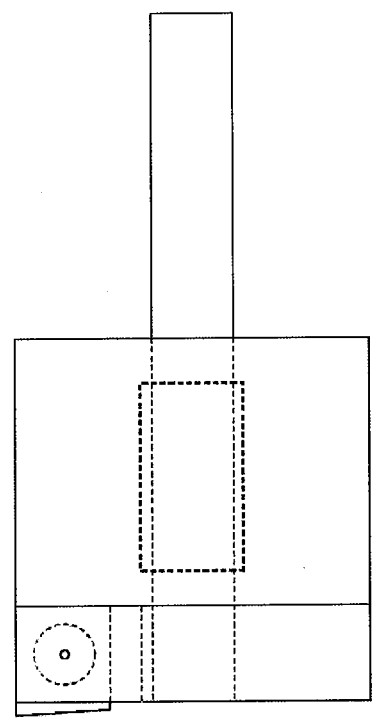

FIGS. 4A-4C illustrate a machine tool 400 with an integrated force gauge 415, according to yet another embodiment of the present invention. FIGS. 4A, 4B and 4D are front, right and top views of machine tool 400, respectively. Similar to machine tool 300 described above, machine tool 400 is a cutting bit that may be coupled to a machine such as a milling machine for performing machining operations. Machine tool 400 includes a body 402 as well as a cutting surface 404 and a force gauge 415. The force of the impact of cutting surface 404 with material 140 during the machining operation excites material 140 in a random pattern. Force gauge 415 measures the force of impact and generates an excitation signal that represents the excitation force applied to material 140 by machine tool 400 during a machining operation. Machine tool 400 also includes onboard circuitry 410 and power generation components 412 similar to those included in machine tool 300.

The force gauge 415 of machine tool 400 is disposed against cutting surface 404 such that the force of impact of cutting surface 404 with a material 140 during a machining operation may be measured. The backlash between the cutting surface 404 and the force gauge 415 may be adjusted with set screw 425.

Figure 5:
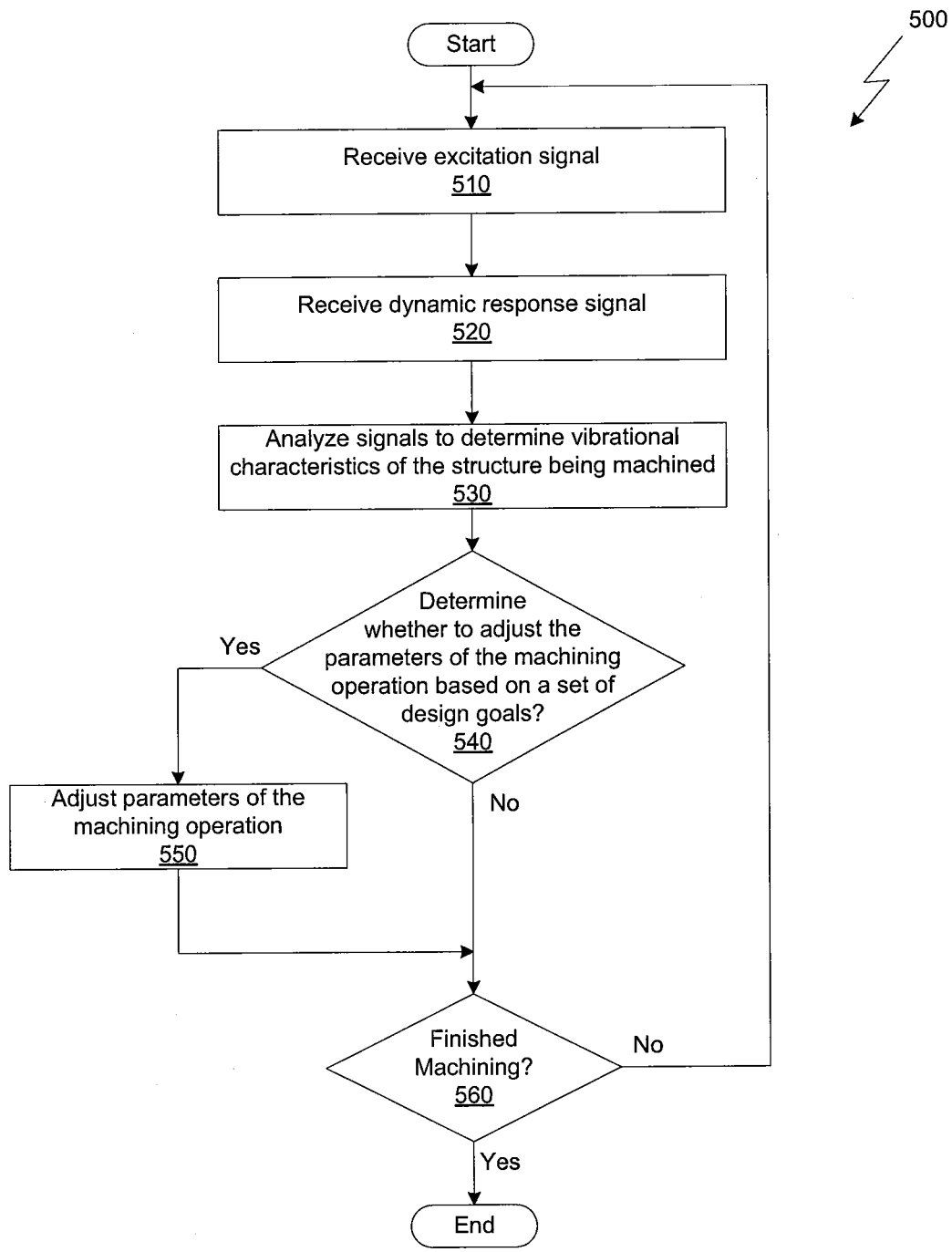
FIG. 5 is a flow diagram of method steps for measuring the dynamic response of a structure during a machining process, according to one embodiment of the present invention.

FIG. 5 is a flow diagram of method steps 500 for measuring the dynamic response of a structure during a machining process, according to one embodiment of the present invention. Although the method steps are described in conjunction with the systems of FIGS. 1-4C, persons skilled in the art will understand that any system configured to perform the method steps, in any order, is within the scope of the inventions.

The method 500 begins at step 510, where signal processing system 110 receives an excitation signal from machine tool 120. The excitation signal corresponds to the measured excitation force applied to material 140 during a machining operation. At step 520, signal processing system 110 receives a dynamic response signal from sensor 125. Sensor 125 generates the dynamic response signal by measuring the dynamic response of material 140 to the excitation force imparted to material 140 by machine tool 120. At step 530, signal processing system 110 analyzes the excitation signal received at step 510 and the dynamic response signal received at step 520 to determine the real-time vibrational characteristics of the material 140 or structure being machined in material 140. In one embodiment, signal processing system 110 performs a modal analysis for the structure by comparing the dynamic response signal to the excitation signal to determine the resonant frequencies of the structure machined in material 140.

At step 540, signal processing system 110 determines whether to adjust the parameters of the machining operation. Signal processing system 110 compares the vibrational characteristics of the material 140 or structure calculated in step 530 with a set of design goals for that material 140 or structure. If the vibrational characteristics of the material 140 or structure match the vibrational characteristics embodied within the set of design goals, then method 500 proceeds to step 560. However, if the vibrational characteristics of the material 140 or structure do not match the vibrational characteristics embodied within the set of design goals, then method 500 proceeds to step 550 where signal processing system 110 adjusts the parameters of the machining operation such as by adjusting the tool-path of machine tool 120. The method 500 then proceeds to step 560.

At step 560, signal processing system 110 determines whether the machining process is finished. If signal processing system 110 determines that the machining process is not finished, then method 500 returns to step 510 and the machining process continues. However, if at step 560, signal processing system 110 determines that the machining process is finished, then method 500 terminates.

In sum, a method and system are disclosed for measuring the dynamic response of a material or structure during a machining process. The system includes a signal processing system connected to a machine tool that includes one or more sensors that dynamically measure a force that is applied to a material when the machine tool is used to modify the material or fabricate a structure from the material. The sensors generate a force signal based on the measured force and the force signal is transmitted to analysis software executing on a computer system. The analysis software compares the force signal to sensor readings that reflect the dynamic response produced by the material during the machining process. Through this comparison, the analysis software dynamically generates a transfer function associated with the material and may adjust the tool-path of the machine tool based on the transfer function.

One advantage of the disclosed approach is that the process of machining a material can be dynamically adjusted based on the measured response of the material. The conventional method of machining a material, measuring the vibrational characteristics of the material, and then modifying the material (if possible) based on the measured characteristics, in multiple, iterative passes, is time consuming. In contrast, a machining process that implements the disclosed approach may produce a structure with precise vibrational characteristics in a single step. Thus, a structure necessitating precise vibrational characteristics can be generated with relative ease compared to prior art approaches While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writeable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A machine tool for measuring the dynamic response of a material during a machining process, comprising:
   a machining implement configured to modify a material during a machining operation; and
   a sensor integrated with the machining implement and configured to measure a force of impact of the machine tool with the material during the machining operation.

2. The machine tool of claim 1, further comprising a circuit component configured to transmit an excitation signal generated by the sensor to a signal processing system connected to the machine tool via a communications path.

3. The machine tool of claim 2, wherein the circuit component comprises a wireless transmitter.

4. The machine tool of claim 3, wherein the communications path is a WiFi network.

5. The machine tool of claim 1, wherein the machining implement comprises an external cylinder having an abrasive surface.

6. The machine tool of claim 5, wherein the machining implement further comprises an internal cylinder supported by at least one bearing and mounted substantially concentric to the external cylinder, the internal cylinder being connected to a rotary drive system, and the sensor being disposed between the internal cylinder and the external cylinder.

7. The machine tool of claim 6, wherein the sensor is coupled to a first boss protruding from the internal cylinder and a second boss protruding from the external cylinder, and wherein the force of impact forces the first boss to interfere with the sensor and the second boss, compressing the sensor between the first boss and the second boss.

8. The machine tool of claim 1, wherein the sensor comprises a piezoelectric force gauge.

9. The machine tool of claim 1, wherein the sensor comprises a Terfenol-D force gauge.

10. The machine tool of claim 1, wherein the machining implement comprises a first cutting surface.

11. The machine tool of claim 10, wherein the sensor is disposed between a body of the machining implement and the first cutting surface.

12. The machine tool of claim 1, wherein the machining implement comprises a plurality of cutting surfaces.

13. The machining tool of claim 12, the sensor comprising a plurality of sensing components, each sensing component in the plurality of sensing components disposed between a body of the machining implement and a corresponding cutting surface of the plurality of cutting surfaces, wherein each sensing component in the plurality of sensing components is configured to measure a force of impact of the corresponding cutting surface and the material.

14. The machine tool of claim 1, further comprising a power generating component.

15. The machine tool of claim 14, wherein the power generating component comprises a piezoelectric device coupled to a capacitor.

16. An apparatus, comprising:
   a machining means for modifying a material during a machining operation; and
   a sensing means integrated with the machining means for measuring a force of impact of the machining means with the material during the machining operation.

17. The apparatus of claim 16, further comprising a transmitting means for transmitting an excitation signal generated by the sensing means to a signal processing means.

18. The apparatus of claim 17, wherein the excitation signal is transmitted via a wireless communication path.

19. The apparatus of claim 18, wherein the wireless communication path is a WiFi network.

20. The apparatus of claim 17, further comprising a power generation means for generating a current to provide power for the sensing means and the transmitting means.

* * * * *